(No Model.)

T. BENTLEY.
SOD SLICING MACHINE.

No. 471,231. Patented Mar. 22, 1892.

Witnesses
John Barr
M. E. Angell.

Inventor.
Truman Bentley
by Chs. H. Riches
Attorney.

THE NORRIS PETERS CO., PHOTO-LITHO., WASHINGTON, D. C.

UNITED STATES PATENT OFFICE.

TRUMAN BENTLEY, OF TORONTO JUNCTION, CANADA.

SOD-SLICING MACHINE.

SPECIFICATION forming part of Letters Patent No. 471,231, dated March 22, 1892.

Application filed August 1, 1891. Serial No. 401,375. (No model.)

*To all whom it may concern:*

Be it known that I, TRUMAN BENTLEY, gentleman, of Toronto Junction, in the county of York, in the Province of Ontario, Canada, have invented certain new and useful Improvements in Sod-Slicing Machines for Laying Lawns; and I hereby declare that the following is a full, clear, and exact description of the same.

The object of this invention is to construct a machine which can be cheaply manufactured and easily manipulated for cutting sods of a uniform length, width, and thickness for laying lawns; and it consists, essentially, of a horizontal knife-blade secured to the frame-work of the machine, the edge of said knife-blade pointing toward the front of said machine for the purpose of cutting the under side of the sod away from the mother-earth, a colter adjustably secured to the frame-work of said machine on each side of said knife-blade for the purpose of cutting the sods into strips of equal width, a roller and toothed segment secured to the frame-work on each side of the machine for the purpose of raising and lowering the colters and knife-blades, so that the thickness of the sod can be regulated, the whole being arranged and operated as hereinafter more fully set forth, and more particularly pointed out in the claim.

Figures 1, 4:
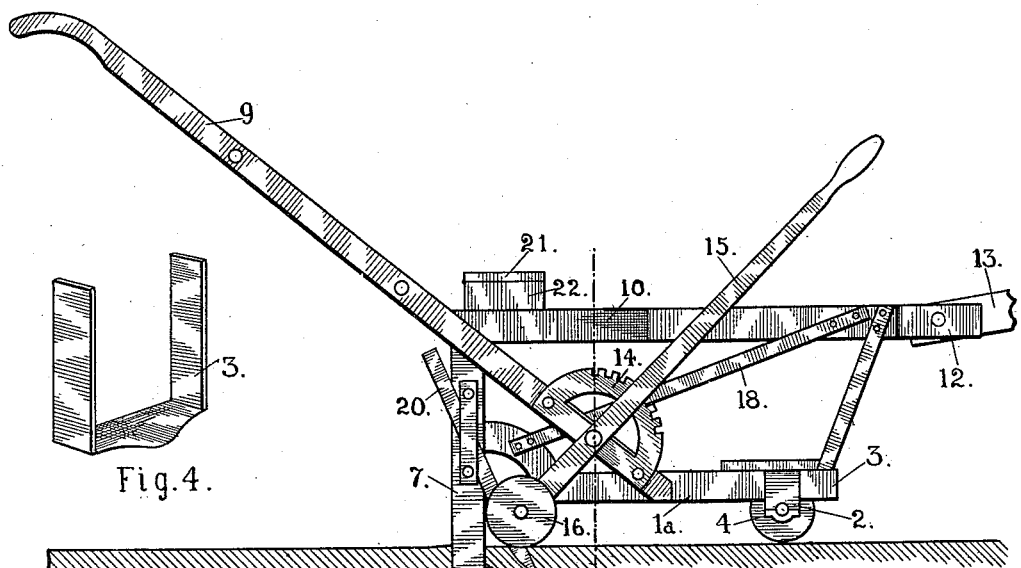
Figure 2:
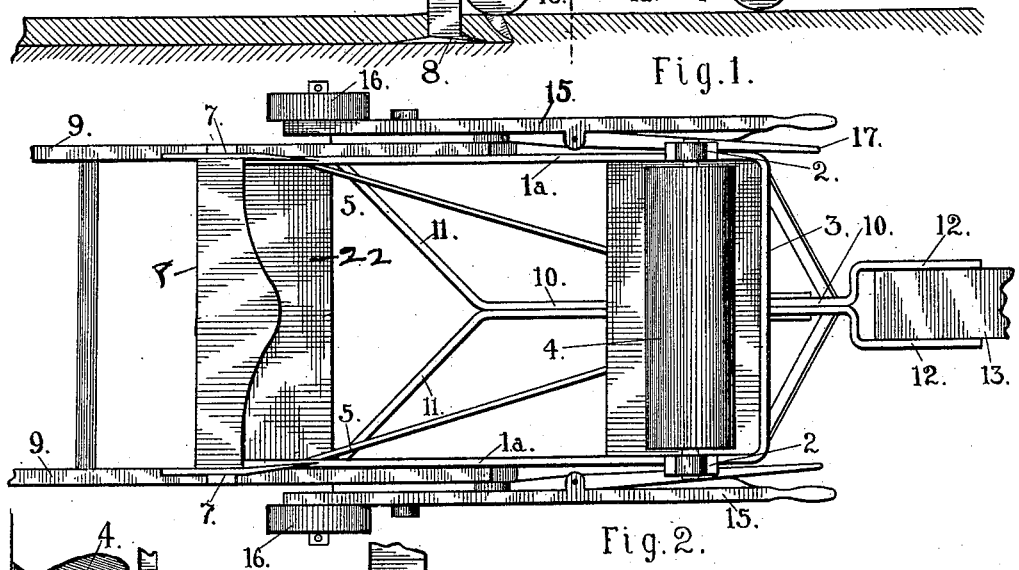
Figure 3:
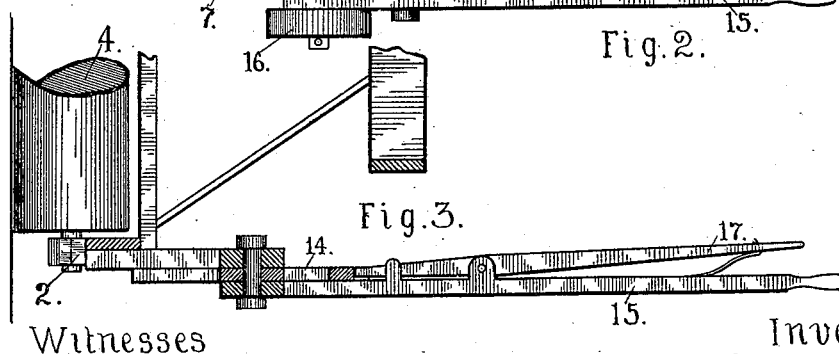

In the drawings, Figure 1 is a side elevation of my machine. Fig. 2 is a plan view, looking at it from the under side. Fig. 3 is a cross-sectional view on the line A A, Fig. 2. Fig. 4 is a perspective view of the knife.

Like numerals of reference refer to like parts throughout the specification and drawings.

In the drawings, 1 refers to the lower frame-work of the machine, which may be made in any desired shape and of any material suitable for the purpose. In this instance the frame-work 1 is shown to consist of three sides of a rectangle, having bearings 2 formed at or near its front or closed end 3, in which are journaled the ends of the land-roller 4, said land-roller supporting and carrying the front end of the machine. The side bars 1ª of the frame-work 1 at the rear or open end 5 are curved upward and securely and rigidly fastened to the uprights 7 a distance above the line of the machine sufficient to prevent the grass or weeds clogging in the junction of said side bars to said uprights and stopping the progress of the machine. The top or upper end of the uprights 7 are secured to the handles 9 of the machine, and the lower ends of said uprights 7 are connected to and carry the knife-blade 8. To the handles 9 or upper end of the uprights 7 is secured the beam 10, forked at each end. The forks 11 on the rear end of said beam are connected to the uprights 7 or handles 9, and the forks 12 at the front end of the machine are connected to the tongue 13.

When a single horse is used to draw the machine, in place of connecting the tongue 13 to the front forks 12 I connect to said front forks the whiffletree and shafts of said horse.

Each of the handles 9 is rigidly connected to the side bar 1ª of the frame-work 1, as well as connected to the top of each of the uprights 7, and each of the side bars 1ª or each of the handles 9 is fitted with a toothed segment 14. Pivotally connected to each of the toothed segments 14 or to each of the handles 9 or side bars 1ª is an arm 15, carrying on its lower end a wheel 16 and on its upper end a lever-dog 17, which engages with the toothed segment 14.

The object of the arm 15, wheel 16, and lever-dog 17 is to adjust the machine to cut sods of any desired thickness, and also to raise the colter and knife from the ground when moving the machine from place to place when not cutting sods.

Connected to the front end 3 of the frame 1 and to the front end of the beam 10 at the rear of the forks 12 are stays 18 for the purpose of strengthening said beam 10. In front of the forks 11 and to the side bars 1ª at their curved part above the colter 20 are braces or stays 19 for the purpose of giving rigidity to the rear portion of said beam 10. Adjustably connected to the uprights 7 are colters 20, one on each side of and directly in front of the knife-blade 8. Said colters are used for the purpose of cutting the sods into strips of uniform width. The knife-blade 8 is in the form of a trapezoid the edge of which is pointed, forming a horn to project a short distance in advance of the body of the blade, so that the knife will more easily pass through the earth. Secured to the upper side of the beam 10 is the driver's seat 21, provided with a tool-box 22.

It will be seen from the foregoing description that it is possible by the use of my machine to cut the sods into strips of uniform width by means of the colters located on each side of the knife-blade and to sever the sod from the mother-earth and raise it by means of the knife-blade.

Having thus fully described my invention, what I claim as new, and desire to secure by Letters Patent, is—

The improved sod-slicing machine herein described and shown, consisting of a main frame, a land-roller secured to the front end of the frame, a horizontal blade having standards at its ends secured to the rear ends of the side bars of the frame, colters secured to the said standards and having their lower ends in advance thereof, levers pivoted on the sides of the frame and provided at their lower ends with rollers adapted to run on the ground, handles secured to the frame and the uprights, and a forked beam secured to the handles and having the draft-pole secured to its front end.

Toronto, May 30, 1891.

TRUMAN BENTLEY.

In presence of—
CHARLES H. RICHES,
M. E. ANGELL.